Patented May 2, 1939

2,156,755

UNITED STATES PATENT OFFICE 2,156,755

COATED FIBROUS SHEET

Erich Gebauer-Fuelnegg, deceased, late of Evanston, Ill., by Marie Gebauer-Fuelnegg, administratrix, Evanston, Ill., and Eugene W. Moffett, Chicago, Ill., assignors, by mesne assignments, to Marbo Patents, Inc., a corporation of Delaware No Drawing. Application July 31, 1937, Serial No. 156,750

4 Claims. (Cl. 91—68)

This application is a continuation in part of our co-pending application, Serial No. 722,252, filed April 25, 1934.

This invention relates to coated fibrous sheet and web material for wrapping and other purposes where a moisture, water, grease and gas resisting material is required.

The difficulty with much of the coated sheet and web material previously proposed for this purpose has been that the coating cracks when the paper is bent or scored, and the material thus loses much of its efficiency as an impervious wrapper or container. In the present invention the fibrous base is coated with a thin layer of a compound of rubber formed by reacting rubber either partially or completely with a hydrogen halide by any suitable process.

It is therefore an object of this invention to provide a fibrous web or sheet base treated with a rubber hydrohalide.

It is a further object of this invention to provide a process for preparing a rubber hydrochloride coated or impregnated fibrous web or sheet material that is highly resistant to the penetration of moisture, water, grease or gases.

Other and further objects of this invention will be evident from the following specification and the accompanying claims.

The rubber hydrohalide used in this process may be produced by the method disclosed in our application Serial No. 703,866, now Patent No. 1,980,396. In this process, unvulcanized rubber, in sheet or comminuted form, is exposed to the action of a hydrogen halide, such as hydrogen chloride, either in gaseous form under pressure or in liquefied condition. When the reaction is partially or substantially complete, the reaction product is isolated.

By stopping before the reaction is complete, a partially reacted product especially suitable for use in the present invention may readily be obtained.

It will be understood that other methods may also be used for making the rubber hydrohalide, such as passing hydrogen chloride through a solution of rubber in benzene, carbon tetrachloride or other volatile solvent.

The rubber hydrochloride preferably should not be entirely reacted with hydrogen chloride where flexibility is particularly important and grease resistance is of lesser importance, but where grease resistance is of high importance, a substantially saturated rubber hydrochloride should be used. Increased flexibility can then be attained by plasticizing the rubber hydrochloride. For ease of plasticization, we prefer the amorphous rubber hydrochloride obtainable by reacting milled sheet rubber with liquefied hydrogen chloride at —85° C. The substantially saturated amorphous rubber hydrochloride thus obtained is more soluble in benzenoil hydrocarbons than other types of saturated rubber hydrochlorides, and is more readily heat sealable, thus giving it other advantages for our purposes. However, any rubber hydrochloride sufficiently resistant to be non tacky is usable.

The rubber hydrochloride is dissolved in any suitable solvent such as carbon tetrachloride, benzene and its homologues, or ethylene dichloride, preferably to a concentration of 8 to 10%, and in general between 4 and 12% by weight.

A satisfactory coating composition can be made by the above procedure, but is preferable to add by the above procedure, but is preferable to add a gum or resin to act as a bonding agent. Such substances cause a firmer adherence of the coating to the fibrous base and may be used in amounts up to 75% of the dry solids contained in the coating solution. The use of various gums or resins in this manner is also advantageous since the viscosity of the solution is somewhat reduced by them.

Various resins and gums have been found to be compatible with rubber hydrochloride and otherwise satisfactory. These include the soft or hard Arochlors, (chlorinated diphenyls), the soft or hard polycumariones, rosin, copal, phenol-aldehydes resins, ester gums, and dammar gum. Various antioxidants may also be added to preserve the rubber hydrochloride if desired.

Waxes such as paraffin wax, bees wax, carnauba wax, etc., may be added in small amounts to the rubber hydrochloride to improve the water and water vapor resistance.

Plasticizers may also be added including the soft cumarone resins, the soft chlorinated diphenyls, chlorinated paraffin, fluid ester gums, dibutyl phthalate, and the like.

The following formula of a satisfactory coating composition is not to be construed as a limitation on the invention since the proportions are not critical, but is to be understood as giving desirable proportions which have been found to be operative.

Example

Percentage by weight

Rubber hydrochloride (amorphous; 29% chlorine content) _____ 30 to 75
Chlorinated diphenyl _____ 70 to 25

The coating solution may comprise a solution of about 8 to 10% by weight of the above mixture in a suitable solvent.

This coating material may be used advantageously on a number of types of paper including grease proof papers such as parchment, glassine and other paper to give a semi-transparent coated sheet material. For many purposes, particularly where high wet strength and oil resistance is important, we prefer parchment paper, generally known as vegetable parchment and obtainable by treating paper such as ordinary sulphite paper with sulfuric acid. The adhesion of rubber hydrochloride to this type of paper is good, and the composite product has high strength and resistance to water, grease, vapor and oil.

The coating may be applied to one or both sides of the fibrous base material in a continuous manner, as by a fountain roll, doctor or the like, in a tower coater, or in a straight pass air floated type of coating machine. In general, the coating will be of a thickness from approximately 1% to 10% of the thickness of the base material when ordinary thicknesses of paper are used. Coatings of .0001" have been found satisfactory, particularly when vegetable parchment is used as a base.

This coating also has the great advantage of being heat sealing. By this is meant that when two sheets of the material are pressed together and heated, a secure bond between them is formed. This makes it possible to use paper which has been coated with this composition in wrapping machines and in the production of bags in a similar manner to waxed paper. It is preferable to waxed paper, in fact, since when waxed paper is sealed in this manner the bond is much weaker than when the material disclosed herein is used.

Our coating has the advantage of being non-tacky at ordinary room temperatures and resistant to the passage of grease, gas, moisture, and water, thus making an ideal wrapping material for foodstuffs.

Coated vegetable parchment, for instance, is admirably suited for making up into bags and other containers for food products, such as frozen foods, fats, butter, coffee and the like. Laminated material may also be prepared with our composition as the adhesive layer.

Where the term "rubber" is used herein and in the claims, it will be understood to mean rubber, caoutchouc, and rubber-like materials, either natural or synthetic in their origin, including balata, gutta percha and chicle.

We are aware that numerous details of the process may be varied through a wide range without departing from the principles of this invention, and we, therefore, do not purpose limiting the patent granted hereon otherwise than necessitated by the prior art.

We claim:

1. A thin, flexible article of manufacture comprising a thin, flexible sheet of vegetable parchment having a coating thereon of a composition comprising a rubber hydrochloride and a resin selected from the group consisting of chlorinated diphenyls, polycumarones, rosin, copal, phenolaldehyde resins, ester gums and dammar gum.

2. A thin, flexible article of manufacture comprising a thin flexible sheet of vegetable parchment having a coating thereon of a composition comprising a rubber hydrochloride and a phenolaldehyde resin.

3. A thin, flexible article of manufacture comprising a thin flexible sheet of vegetable parchment having a coating thereon of a composition comprising a rubber hydrochloride and a chlorinated diphenyl.

4. A thin, flexible article of manufacture comprising a thin flexible sheet of vegetable parchment having a coating thereon of a composition comprising a rubber hydrochloride and a polycumarone.

MARIE GEBAUER-FUELNEGG.
*Administratrix of the Estate of Erich Gebauer-Fuelnegg, Deceased.*
EUGENE W. MOFFETT.